Dec. 26, 1967  D. F. GOURLAY ET AL  3,359,726
VARIABLE VOLUME, VARIABLE PRESSURE HYDRAULIC POWER SUPPLY
Filed Nov. 1, 1966  8 Sheets-Sheet 1

INVENTORS
DOUGLAS F. GOURLAY
HAROLD J. STRAUT
BY
Constantine A. Michalos
ATTORNEY Dec. 26, 1967  D. F. GOURLAY ET AL  3,359,726
VARIABLE VOLUME, VARIABLE PRESSURE HYDRAULIC POWER SUPPLY
Filed Nov. 1, 1966  8 Sheets-Sheet 3

INVENTOR.
DOUGLAS F. GOURLAY
HAROLD J. STRAUT
BY
Constantine R. Michalos
ATTORNEY INVENTORS
DOUGLAS F. GOURLAY
HAROLD J. STRAUT
BY
Constantine A. Michalos
ATTORNEY Dec. 26, 1967  D. F. GOURLAY ET AL  3,359,726
VARIABLE VOLUME, VARIABLE PRESSURE HYDRAULIC POWER SUPPLY
Filed Nov. 1, 1966  8 Sheets-Sheet 6

INVENTORS
DOUGLAS F. GOURLAY
HAROLD J. STRAUT
BY
Constantine A. Michalos
ATTORNEY

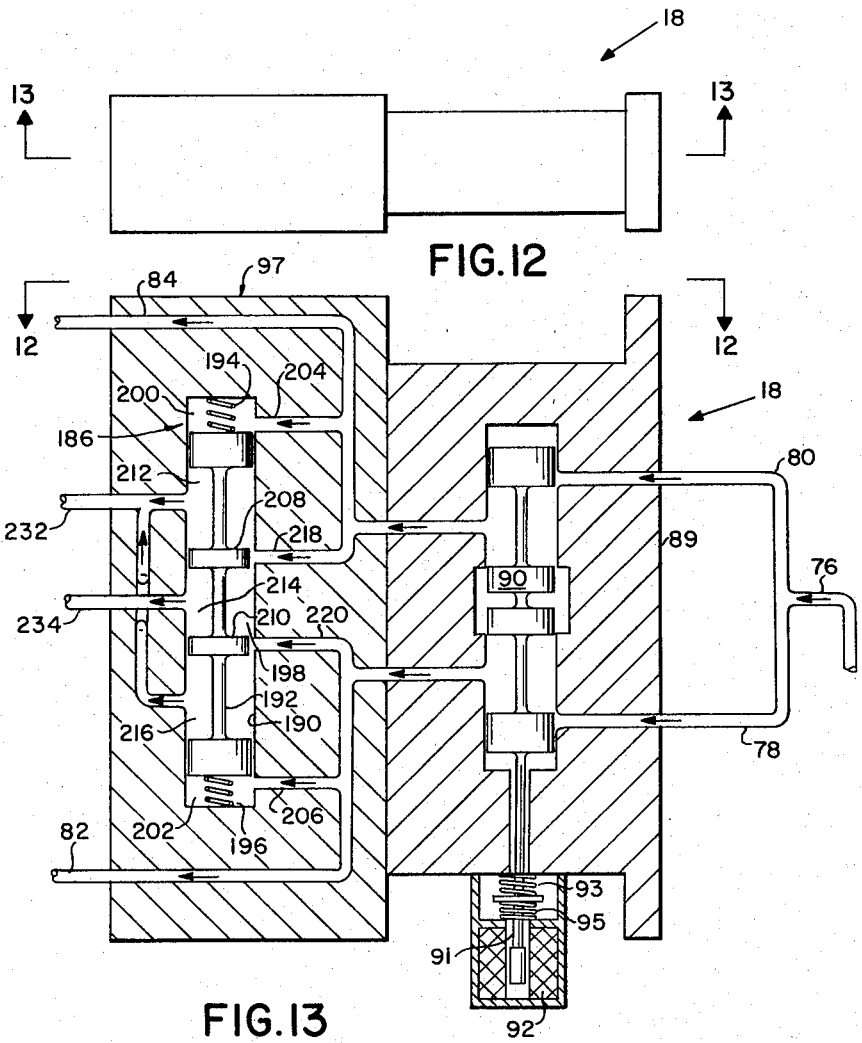

United States Patent Office 3,359,726
Patented Dec. 26, 1967

3,359,726
VARIABLE VOLUME, VARIABLE PRESSURE HYDRAULIC POWER SUPPLY
Douglas F. Gourlay, Closter, and Harold J. Straut, Wayne, N.J., assignors to General Precision Inc., Little Falls, N.J., a corporation of Delaware
Filed Nov. 1, 1966, Ser. No. 591,182
9 Claims. (Cl. 60—52)

ABSTRACT OF THE DISCLOSURE

A closed-loop variable-flow delivery, variable discharge pressure and variable volume type of hydraulic actuation system, for driving a variable load, with the actuator having a hydraulic power supply which affords a reduction in input power requirements over present state-of-the-art power sources by more closely matching the power supply characteristics to the varying load requirements.

---

The present invention relates to hydraulic actuation systems, and particularly to a closed-loop, variable flow delivery, variable-pressure, and variable volume, hydraulic-actuation system which affords a reduction in input power requirements by closely matching the power supply characteristics to the varying load requirements.

A prior-art hydraulic-actuation system, which is a closed-loop, constant-flow, constant-pressure type of system is described in U.S. Patent No. 3,201,939, which is assigned to the same assignee as in this invention. An improved version of said prior-art hydraulic actuation system, which is a closed-loop, constant-flow, two-pressure-level type of system, is described in the publication by W. Seamone, APL Technical Digest, November, December 1964, pages 12–16, inclusive, and a further improved version of a closed-loop, constant-flow, variable-pressure system is described in a copending U.S. application, Ser. No. 520,560, which was invented by the same inventors and assigned to the same assignees as this invention.

This approach still does not produce a substantial reduction in input power requirements, since the power supply was not matched with the varying load requirements.

Accordingly, it is one object of the invention to provide a closed-loop variable-flow delivery, variable discharge pressure and variable volume type of hydraulic actuation system, for driving a variable load, with the actuator having a hydraulic power supply which affords a reduction in input power requirements over present state-of-the-art power sources by more closely matching the power supply characteristics to the varying load requirements.

It is another object of the invention to provide a hydraulic actuation system having variable flow and variable pressure for substantially minimizing the variation in the ratio of power input to power output thereby permitting a more efficient usage of the hydraulic power supply.

It is a further object of the invention to provide a hydraulic actuation system having a variable flow-variable pressure power supply for closely matching the load requirements over a wide range of load variation thereby providing the most efficient usage of a hydraulic supply representing a considerable system power saving over the usual constant pressure-constant flow supply as well as over the variable pressure-constant flow supply.

It is a still further object of the invention to provide a hydraulic actuation system having a variable flow-variable pressure power supply with a servo valve having a gain insensitive to load over a large portion of the operating cycle.

Figure 2:
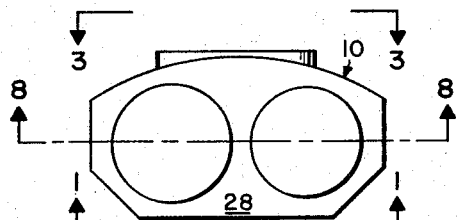
Figure 6:
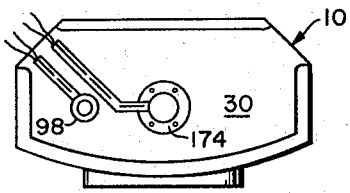
Figure 1:
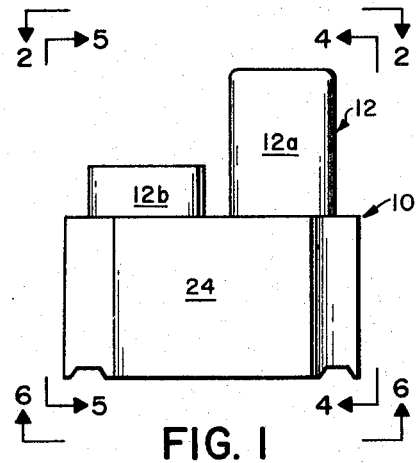
Figure 4:
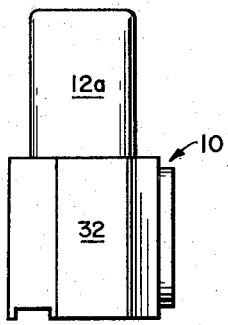
Figure 3:
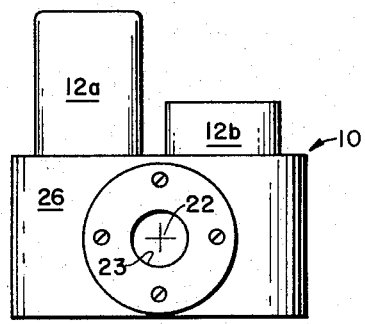
Figure 5:
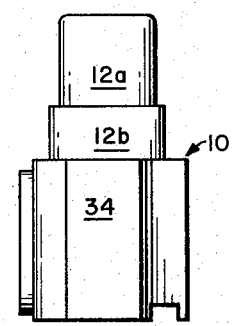
Figure 7:
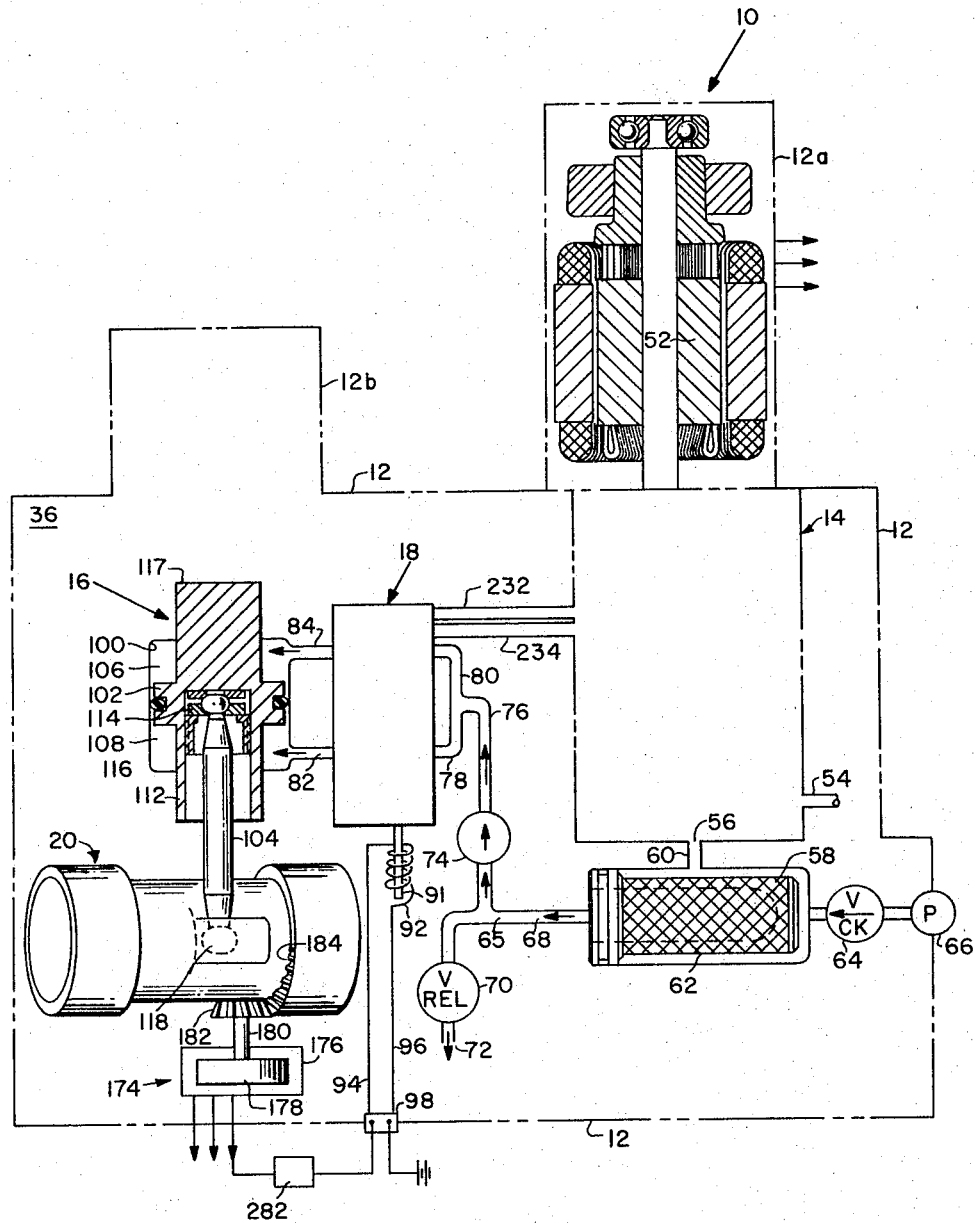
Figure 8:
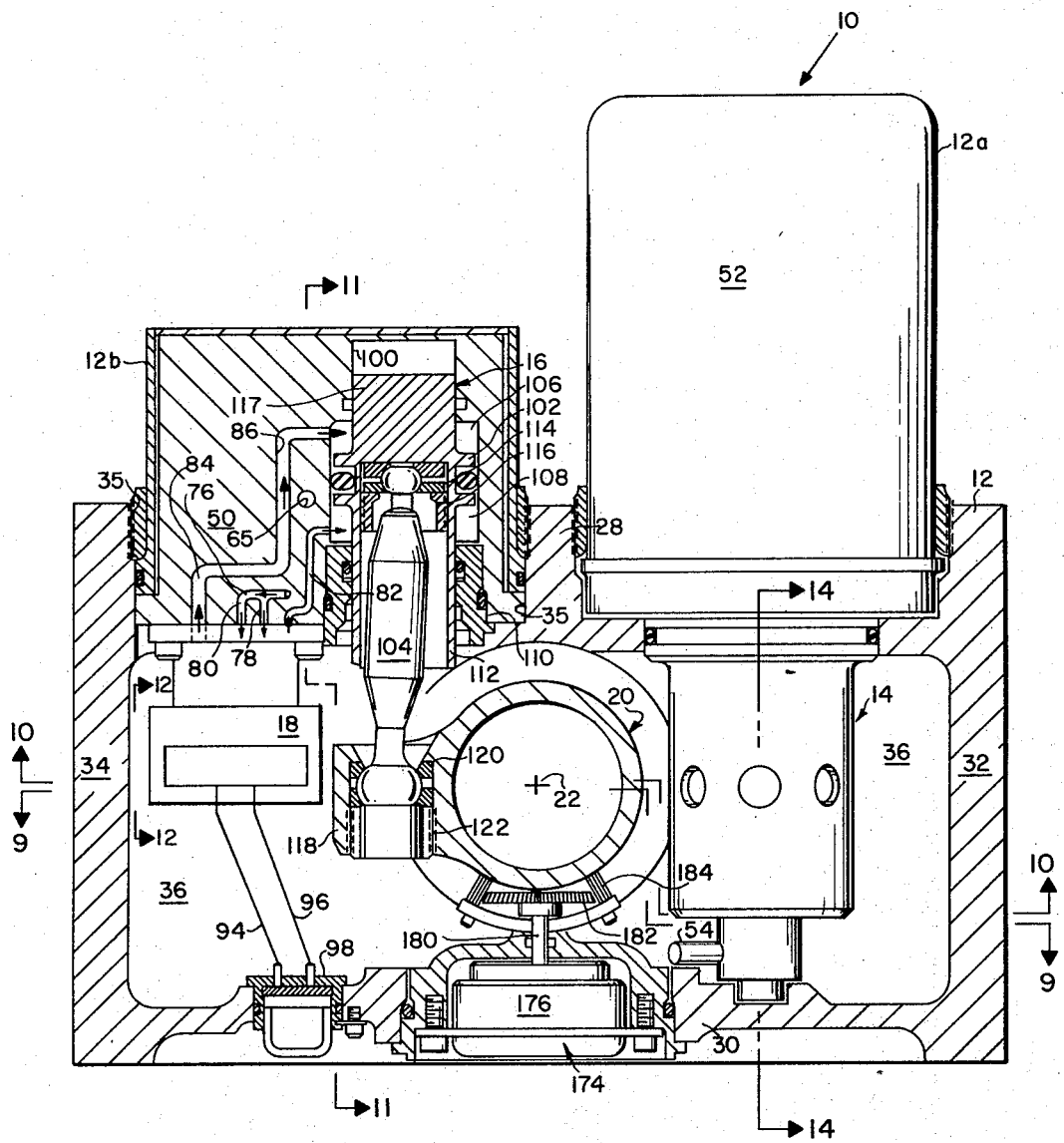
Figure 9:
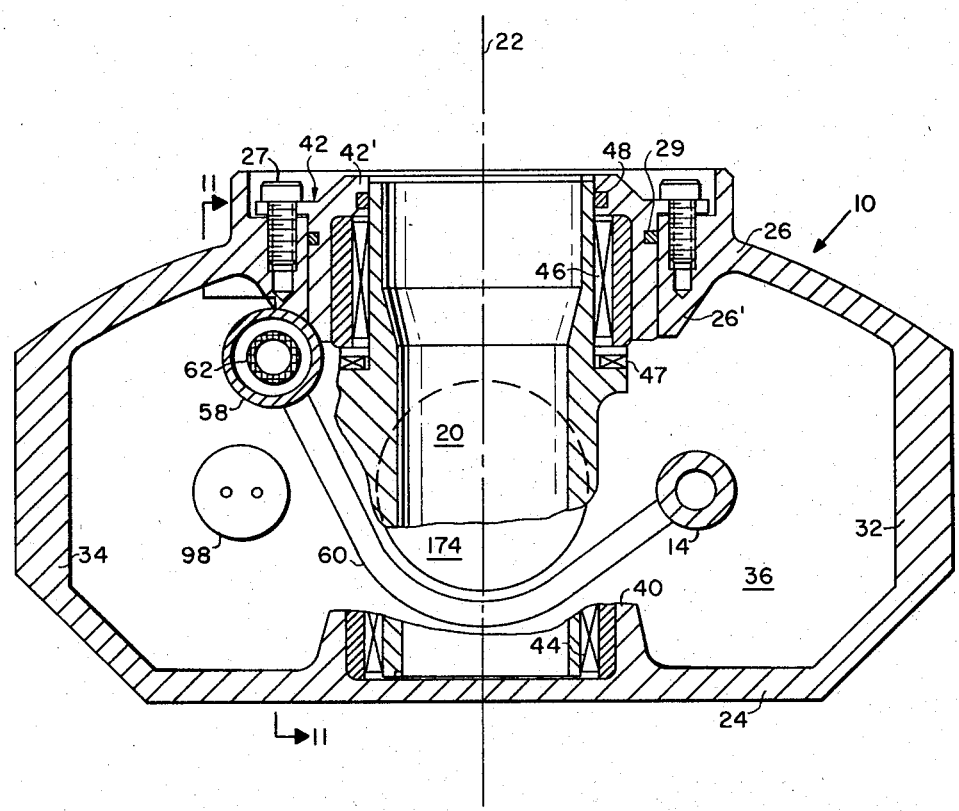
Figure 10:
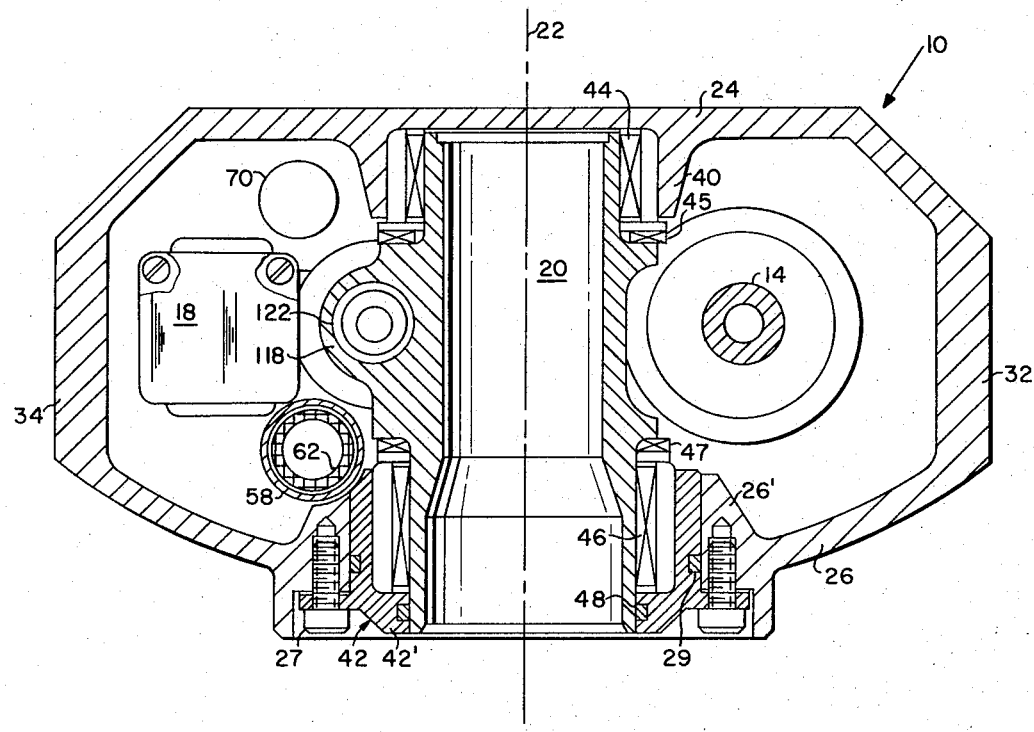
Figure 11:
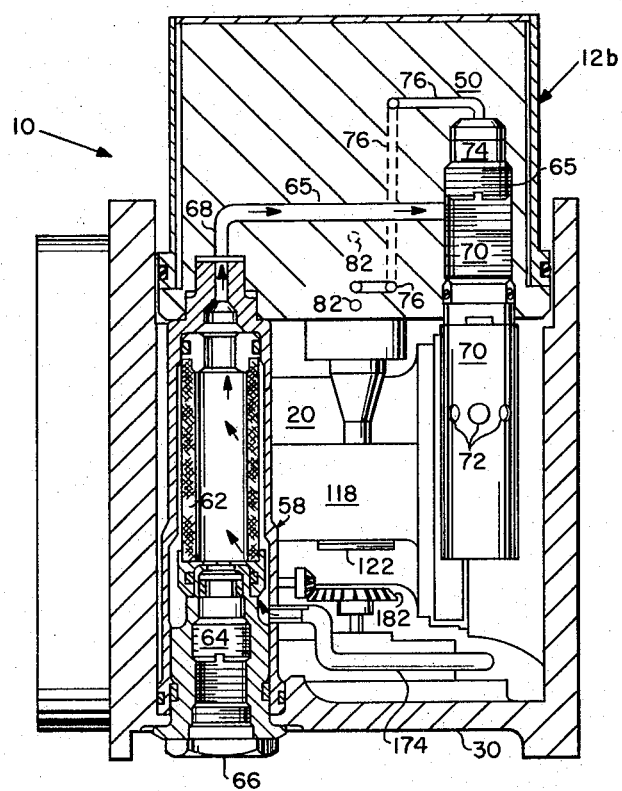
Figure 14:
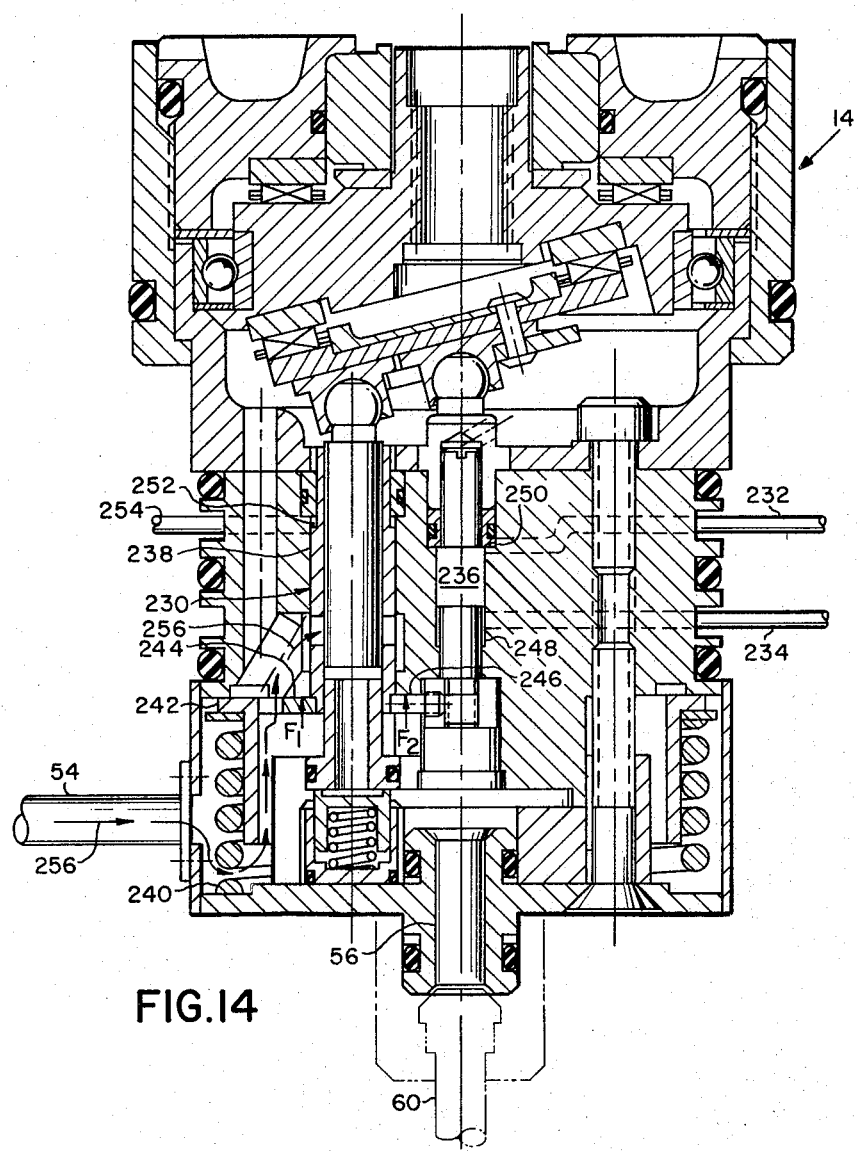

Other objects of the invention will become apparent upon reading the annexed detail description in connection with the drawings wherein like parts are designated by like numerals throughout the several views and wherein:

FIG. 1 is a view of the exterior of a hydraulic actuating unit embodying features of the present invention;
FIG. 2 is a view taken on line 2—2 of FIG. 1;
FIG. 3 is a view taken on line 3—3 of FIG. 2;
FIG. 4 is a view taken on line 4—4 of FIG. 1;
FIG. 5 is a view taken on line 5—5 of FIG. 1;
FIG. 6 is a view taken on line 6—6 of FIG. 1;
FIG. 7 is a schematic diagram of one form of a hydraulic actuating system, such as contained in the unit shown in FIGS. 1–6, embodying the present invention;
FIG. 8 is a sectional view as taken on line 8—8 of FIG. 2;
FIG. 9 is a sectional view as taken on line 9—9 of FIG. 8;
FIG. 10 is a sectional view as taken on line 10—10 of FIG. 8;
FIG. 11 is a sectional view as taken on line 11—11 of FIG. 8;
FIG. 12 is a sectional view as taken on line 12—12 of FIG. 13;
FIG. 13 is a sectional view as taken on line 13—13 of FIG. 12; and,
FIG. 14 is a sectional view as taken on line 14—14 of FIG. 8.

Referring to FIGS. 1 through 6 of the drawings, one embodiment of the present invention comprises a self-contained hydraulic actuating or torquing unit 10 enclosed within a housing 12 which contains working fluid. Housing 12 includes a first protruding housing section 12a which contains part of a submerged pump (hereinafter described and designated by reference numeral 14) for pressurizing one fluid, and a second protruding housing section 12b, which contains part of a submerged actuator (also described hereinbelow and designated by reference numeral 16) that is driven by the pressurized fluid. The system is schematically shown in FIG. 7.

As shown in FIG. 8, unit 10 also has a flow-control servo valve means 18 which controls fluid leaving pump 14 and entering actuator 16. Unit 10 also contains an internal shaft 20 with an axis 22 accessible through aperture 23 in casing 12, as shown in FIG. 3. Actuator 16 imparts reversible rotary movement of shaft 20 about axis 22 relative to casing 12. A work load (not shown) is preferably connected to shaft 20 coaxially therewith along axis 22.

As best appears in FIGS. 1–6, casing or main support 12 has front and back walls 24, 26 top and bottom walls 28, 30 and end walls 32, 34 which form a sealed pressurized reservoir cavity 36 (FIG. 8) therebetween. It should be noted that the means of pressurizing the reservoir cavity 36 is not shown but any method can be used to pressurize the cavity to provide positive flow to the pump 14 or wherever needed in the system.

As shown in FIGS. 9 and 10, front wall 24 of the casing is provided with an internal annular boss 40 holding an anti-friction bearing 44 journaling one end of shaft 20. The other end of shaft 20 is journaled in an anti-friction bearing 46 mounted in a bearing retainer 42 coaxially received in an internal boss 26' on back wall 26 of the casing. Bearing retainer 42 is secured in position by suitable means such as threaded fasteners 27, and is sealed to boss 26' by means of an O-ring 29 or the like. An inwardly-extending flange 42' on bearing retainer 42 limits axial displacement of bearing 46 and, on its inner circumferential face, carries an O-ring 48 or similar packing which engages the outer surface of shaft 20, thus precluding leakage of hydraulic fluid through bearing 46.

Shaft 20 also carries thrust-type bearings 45, 47 adjacent bearings 44, 46 respectively.

Top wall 28 (FIG. 8) has a removable wall portion or a hydraulic manifold portion 50, which forms the support for actuator 16 and valve 18.

Pump 14 (FIGS. 7 and 8), which is preferably a wobble-plate type of pump, as hereinafter more fully described, has a drive means 52, which is preferably an electric motor. Motor 52 is mounted on and forms a removable portion of top wall 28. Motor 52 also supports pump 14, which is integrally connected thereto, so that pump 14 is enclosed within cavity 36 and is submerged in the cavity reservoir fluid.

Pump 14 has an inlet port 54 for receiving fluid from cavity 36, and has an outlet connection 56, which is connected to a filter 58 by a filter supply tube 60 (as illustrated in FIG. 9), for providing fluid flow from pump 14 to filter 58, which in turn provides fluid flow to valve 18 and thence to actuator 16.

Filter assembly 58 (FIG. 11) has an upper end supported by manifold 50 and has a lower end supported by, and extending through, wall 30. Filter assembly 58 contains a screen 62 and also encloses a check valve 64 adjacent its lower end, which has a fill port 66 with a removable plug, that is sealingly threaded into valve 64 from the exterior side of bottom wall 30. Make-up fluid may be introduced through fill port 66 into cavity 36 to offset any fluid leakage from apparatus 10. Check valve 64 permits the removal of the plug in fill port 66 without outflow of pressurized fluid, the fluid being normally pressurized by pressurizing means during both operating and shut-down conditions. In-flow of fluid from tube 60 bypasses check valve 64 and flows through filtering screen 62 in passing through filter 58.

Manifold 50 has a passage 68 which conducts outlet flow from filter 58. Manifold 50 also supports a safety relief valve 70 with an inlet (not shown) connected to passage 68, which opens when a fluid pressure exceeds a designed maximum pressure to return fluid by way of outlets 72 to the reservoir cavity 36. Manifold 50 also supports a check valve 74 connecting to passage 68 and has a passage 76 extending from the outlet of check valve 74 to the inlet of flow control valve 18.

Servo valve 18 receives an inflow from passage 76, which divides into two feed passages 78, 80 before entering valve 18. Manifold 50 has a first supply passage 82 and a second supply passage 84, both of which are connected to servo valve 18 to supply fluid flow from valve 18 to actuator 16. Fluid passing through passage 84 passes through a vertical passage portion 86, as shown in FIG. 8, before entering actuator 16.

Servo valve 18 (FIGS. 12, 13) includes a four-way proportional flow-control valve 89 with an adjustable spool-type member 90, which connects passage 78 to passage 82 or alternately, which connects passage 80 to passage 84. Valve 89 has a proportional solenoid coil 92 with a plunger 91, which is fixed to one end of spool 90. Valve 89 also has a pair of springs 93, 95; and has a pair of leads 94, 96 with a terminal block 98, as shown in FIG. 8.

Valve 18 (FIGS. 12, 13) also has a load sensor 97, as explained hereafter in further detail.

Actuator 16 has a cylinder 100, preferably in the form of a cylindrical recess disposed in the inner side of manifold 50; and has a piston 102 received in cylinder 100. Piston 102 has a thrust link 104, which is connected at one end to piston 102 by a universal pivot type of connection. Piston 102 forms chambers 106 and 108 in cylinder 100. Cylinder 100 has a partition wall or end cap 110 separating chamber 108 from cavity 36. Piston 102 has a hollow piston rod or actuator rod 112 extending through end cap 110 and surrounding thrust link 104 to allow limited lateral movement of thrust link 104 during its reciprocating motion. Thrust link 104 is pivotally connected to piston 102 by bearing outer races 114, which are disposed between the outer surface of link 104 and the inner surface of hollow rod 112, and which are urged in bearing against link 104 by a bearing retaining nut 116. Equal-area piston 102 also has a solid piston rod 117.

Shaft 20 has an eccentric portion 118, which is pivotally connected to the free end of thrust link 104. Eccentric 118 has recessed bearing races 120 which are urged in bearing against link 104 by a bearing retaining nut 122.

As shown diagrammatically in FIG. 7, apparatus 10 also has a position read-out potentiometer 174 enclosed within a housing 176 mounted on the exterior surface of wall 30 (as appears in FIG. 8). Potentionmeter 174 includes an electrical resistance element (not shown) and a rotor wiper 178 secured to a drive shaft 180 which projects from housing 176 and extends through wall 30 into cavity 36. A bevel gear 182 fixed to shaft 180 within cavity 36 engages a coaxial, beveled ring gear segment 184 on the outer surface of shaft 20. By means of suitable conventional electrical circuitry (not shown) associated with potentiometer 174, the position of wiper 178 can be monitored and, thus, by suitable calibration, indicate the angular position of shaft 20 relative to a fixed datum. Load sensor 97 (FIG. 13) includes a shuttle valve 186, which is connected to valve 89.

Shuttle valve 186 (FIG. 13) has a cylinder 190, a shuttle 192, which is disposed therein for displacement relative thereto, and a pair of springs 194, 196, which are disposed within cylinder 190 adjacent to the opposite ends of shuttle 192.

Shuttle 192 divides cylinder 190 into an intermediate cavity 198 and to end chambers 200, 202, in which springs 194, 196 are respectively disposed. End chambers 200, 202 have respective inlet passages 204, 206, that connect respectively to supply passages 84 and 82. Shuttle 192 also has two spaced annular shoulders 208, 210, which divided intermediate cavity 198 into three intermediate chambers 212, 214, 216. Chambers 212, 216 are disposed adjacent respective end chambers 200, 202; and have respective intermediate inlet passages 218, 220 that connect to supply passages 84 and 82, respectively. Springs 194, 196 have an initial compression, and shoulders 208, 210 have passage overlaps to avoid a small-load disturbance.

Actuation apparatus 10 also has a conventional type of feed-back servo 282 (FIG. 7), which connects potentiometer 174 to terminal 98 thereby connecting actuator 16 to valve 18. With this construction, solenoid 92 regulates valve 18, which in turn operates actuator 16. Solenoid 92 immediately senses any slight reaction of actuator 16 thereby providing a sensitive, proportional control on actuator 16 for setting the velocity levels of piston 102.

More specifically, as best shown in FIGURES 7, 13, and 14, the present improvement provides that the closed-loop, variable flow delivery-variable discharge pressure hydraulic power supply is primarily produced by five variable volume, variable pressure pump elements 230 and the load sensing shuttle valve 97. The pump elements 230 are driven at approximately constant speed by the external drive means or electric motor 52 to deliver an output flow as required to satisfy load demands sensed by the load sensing valve 97 which is connected by control passages 232, 234 to load sensing piston 236 in the pump 14, while simultaneously establishing the system pressure proportional to load torque.

As shown in FIGURE 14, the control of both flow delivery and system pressure is accomplished through the mechanism of summing forces $F_1$ and $F_2$ at piston sleeves 238 of the pump elements 230. A minimum system cut-off pressure is established by the pre-load level of a helical or biasing spring 240 acting through a retainer plate 242 having five tabs 244 to produce force $F_1$ to each of the five sleeves 238. This minimum pressure level will provide a constant pressure drop across the system servo valve for most load conditions.

Increase of the system pressure above this minimum pressure level is obtained in response to external load demand. That is, the system cut-off pressure is controlled by a variable force $F_2$ applied to the five sleeves 238 through five tabs 246 attached to the sensing piston 236 and activated by the sensing valve 97 which senses the instantaneous external load on the actuator 16. The sensing valve 97 directs pressure to a lower area 248 of the piston 236 or to an upper area 250 of the piston 236, as viewed in FIGURE 14, through lines 234 and 232, respectively, to move the piston 236 and thereby vary the force $F_2$. The direction of this variable force $F_2$ on the sleeve is the same as the force $F_1$ from the bias spring 240.

Opposing these two forces $F_1$ and $F_2$ on each sleeve 238 is a force produced by the action of system pressure on an area 252 of each sleeve 238 through line passage 254 which is connected to the system pressure (not shown). Variable flow delivery is, therefore, controlled by changing the piston 236 cut-off position to establish the useful portion of the piston stroke. This is accomplished by moving up concentric sleeve 238 surrounding each piston in a vertical direction as viewed in FIGURE 14. As described, therefore, in the five piston design, each of the five sleeves 238 is acted upon by one tab 244 of the retainer plate 242 transmitting the force $F_1$ from the minimum cut-off pressure helical spring 240, and one tab 246 of the piston 236 transmitting the force $F_2$ from the load-sensing valve 97. The sum of these two forces $F_1$ and $F_2$ on each sleeve 238 establish the desired operating pressure and volume flow of the system.

When pump discharge flow rate exceeds that required by the system, the system pressure tends to increase above the desired level. The resulting force from application of this system pressure on the sleeve area moves the sleeves 238, in such a vertical direction, as viewed in FIGURE 14, so as to reduce the effective stroke of the piston 236 and thereby decrease the output flow.

Thus, a closed loop force balance is present at the sleeves 238 to maintain a delivered flow and system pressure as demanded by the load. By correctly matching the hydraulic power supply output to the load demand, an improved power efficiency for widely varying load cycles is obtained. In addition, a constant pressure drop across the servo valve is maintained, resulting in an actuator velocity gain and frequency response that is independent of load for most conditions.

It should be noted again that the minimum cut-off pressure is established by the selection of the initial compression of the spring 240. The spring force $F_1$ is transmitted to each of the sleeves 238 by the tabs 244 or the retainer plate 242 in the absence of external loads on the system actuator 16, these forces $F_1$ and $F_2$ on the sleeve 238 are opposed by the pump discharge pressure acting upon a differential area 252 of the shoe-end of the sleeves 238. With zero external load, the displacement of each sleeve 238 is governed by system flow demand only through the repositioning of the sleeve 238 against the spring 240. For example, a pump element flow in excess of system flow demand increases system pressure and moves the sleeve 238 to further compress the spring 240 and establish a force balance. Motion of the sleeve 238 changes the effective volumetric stroke of piston 236 to reduce delivered flow to the quantity required by the system.

When external loads are imposed upon the system actuator 16, the load sensing shuttle valve 97 ports the actuator load differential pressure to the load sensing piston 236 in the pump 14 in such a manner as to produce an absolute net force across this piston 236 in the same direction, regardless of the direction of the load disturbance. This force is transmitted to each of the aforementioned sleeves through the tabs 244 of the retainer plate 242. The resulting force balance on any one of the sleeves 238 producing the system pressure is established in response to the external load. The position of the sleeve 238 will be adjusted to establish the flow rate desired by the system in response to the system pressure feedback to the differential area of the sleeve 238.

In summary the advantages of the power supply described herein provides for a variable flow-variable pressure approach which permits the power supply to closely match the load requirements over a wide dynamic range of load variation thereby providing the most efficient usage of a hydraulic power supply. This approach represents a considerable system power saving over the usual constant pressure-constant flow supply as well as further power savings over the variable pressure-constant flow supply system.

As an included feature, the variable flow-variable pressure power supply makes the system servo valve gain insensitive to load over a large portion of the operating cycle. This results from the fact that the system pressure increase over the minimum no-load valve is equal to the load demand, keeping a constant pressure drop across the servo valve. This constant drop produces a commanded load velocity output and a system frequency response which are independent of load.

While the present invention has been described in a preferred embodiment, it will be obvious to those skilled in the art that various modifications can be made therein within the scope of the invention, and it is intended that the appended claims cover all such modifications.

What is claimed is:

1. In a closed-loop hydraulic actuator system having, hydraulic actuator and pump means for supplying hydraulic fluid to said actuator, including variable volume-variable pressure pump element for varying the operating pressure and volume flow of hydraulic fluid to said actuator, flow-control means interposed between said pump element and said actuator for controlling fluid leaving said pump element and entering said actuator, and load sensing means operably receiving information from said flow-control means as to the power demands of said actuator and thereby directing the information to said pump element for producing a variable discharge pressure-variable volume hydraulic power supply to said actuator closely matching the power demands of said actuator, the improvement therein, wherein said variable volume-variable pressure pump element includes, reciprocating pump piston for pumping hydraulic fluid through the actuator system, sleeve means concentric to and enveloping said piston and having a fluid inlet passage directing hydraulic fluid to said piston, and said load sensing means includes, means for exerting a first axial force against said sleeve proportionally to the load demands of said actuator for adjustably moving said sleeve and thereby the fluid inlet passage axially relative to said pump piston to change the effective stroke of said pump piston for changing the operating pressure and volume flow said piston pumps at each reciprocating cycle, whereby the flow of the hydraulic fluid to said actuator changes depending on the actuator load demand.

2. The structure of claim 1, wherein said load sensing means is a piston connecting said sleeve means and having opposed pressure areas for receiving differential pressure from said actuator and controlled by said flow-control means for applying a variable force to said sleeve means depending on the load requirements of said actuator for axially moving said sleeve and thereby the fluid inlet passage relative to said reciprocating pump piston thereby changing the effective stroke of said pump piston.

3. The structure of claim 1, further comprising biasing means for exerting a constant second axial force against said sleeve in the same direction as the first axial force exerted on said load sensing means to provide for a minimum system cut-off pressure and thereby produce a constant minimum pressure drop across the system.

4. The structure of claim 1, wherein said sleeve includes means at one end portion opposite to its end portion on which said first and second forces are acting upon for directing pump discharge pressure axially on said sleeve opposing said first and second forces and thereby producing a closed-loop force balance to maintain a delivered flow and system pressure as demanded by the actuator load.

5. The structure of claim 1, wherein said flow-control means includes a housing, a load sensor supported within said housing with passages for in-flow of differential pressure from said actuator for sensing the actuator's load demands, and passages for out-flow of controlled pressure directed to said load sensing means for exerting the first axial force against said sleeve, a flow control valve operably directing pressure to one or the other of the in-flow passages depending on the direction or actuation desired for positioning said load sensor for producing the desired actuation.

6. The structure of claim 6, wherein said flow-control means includes pressure passages for applying pressure from said pressure pump element simultaneously to said actuator for its operation and to said load sensing means through said load sensor for supplying pressure depending on the demands of said actuator.

7. The structure of claim 1, wherein said pump means includes an enclosed housing, a wobble plate rotatable within said housing, driving means for rotating said wobble plate at constant speed, inlet port means for receiving hydraulic fluid within said housing, said reciprocating pump piston including a plurality of pump pistons connected to said wobble plate and operable thereby for reciprocating at constant speed, a sleeve concentric to and enveloping each of said pump pistons, each of said sleeves having an inlet port for supplying hydraulic fluid to each of said pistons while said pistons reciprocate for delivery of output hydraulic fluid from said housing and then supplying the output hydraulic fluid to one end of said sleeve, and a pre-load biasing spring connecting the other end of said sleeve for exerting a constant second force in the direction of the first force axially against said sleeve additionally axially moving said sleeve and thereby the fluid inlet port relative to said pump piston for changing the effective stroke of said pump piston and thereby establishing a minimum system cut-off pressure, while the first force acting upon said sleeve operably changes the effective stroke of said pump piston relative to the load demand of said actuator.

8. The structure of claim 1, wherein said pump means includes an enclosed housing, a wobble plate rotatable within said housing, driving means for rotating said wobble plate at constant speed, inlet port means for receiving hydraulic fluid within said housing, said reciprocating pump piston including a plurality of pump pistons connected to said wobble plate and operable thereby for reciprocating at constant speed, a sleeve concentric to and developing each of said pump pistons, each of said sleeves having an inlet port for supplying hydraulic fluid to each of said pistons while said pistons reciprocate for delivery of output hydraulic fluid from said housing and then supplying the output hydraulic fluid to one end of said sleeve, a constant pre-load biasing spring connecting the other end of said sleeve for exerting a constant second force in the direction of the first force axially against said sleeve additionally axially moving said sleeve and thereby the fluid inlet port relative to said pump piston for changing the effective stroke of said pump piston and thereby establishing a minimum system cut-off pressure, while the first force acting upon said sleeve operably changes the effective stroke of said pump piston relative to the load demand of said actuator, wherein said flow-control means includes a four-way proportional flow-control valve having a cylinder, an adjustable spool type member axially movable within said cylinder, solenoid valve means operable for moving said spool member axially in one direction or in an opposed direction for supplying said load sensing servo valve with the delivered output hydraulic fluid from said pump means, and wherein said flow-control means further includes a load sensing servo valve having a manifold with a cylinder, a shuttle valve reciprocal within said cylinder and forming a pair of end chambers with said cylinder, spring means disposed at each end chamber for balancing said cylinder, said shuttle valve including piston members producing a central chamber and a pair of opposed intermediate chambers, the manifold additionally having a first supply passage connecting the central chamber to said load sensing means for driving said sensing means in one direction and a second supply passage connecting the intermediate chambers to said load sensing means for driving said sensing means in an opposed direction, whereby said sensing means axially moves said sleeve and in turn, the inlet port and thereby the effective stroke of said pump piston for supplying the desired pressure and volume flow to said actuator proportional to the actuator load demand.

9. The structure of claim 1, wherein said pump means includes an enclosed housing, a wobble plate rotatable within said housing, driving means for rotating said wobble plate at constant speed, inlet port means for receiving hydraulic fluid within said housing, a plurality of pump pistons connected to said wobble plate and operable thereby for reciprocating at constant speed, a sleeve concentric to and enveloping each of said pump pistons, each of said sleeves having an inlet port for supplying hydraulic fluid to each of said pistons while said pistons reciprocate for delivery of output hydraulic fluid from said housing means and then supplying the output hydraulic fluid to one end of said sleeve, a constant pre-load biasing spring connecting the other end of said sleeve for exerting a second force in the direction of the first force axially against said sleeve additionally moving said sleeve and thereby the fluid inlet port axially, relative to said pump piston and thereby establishing a minimum system cut-off pressure, while the first force acting upon said sleeve operably changes the effective stroke of said pump piston relative to the load demand of said actuator, and wherein said load sensing means includes a sensing piston having opposed areas; one area receiving fluid to drive the sensing piston in one direction and the other area receiving fluid to drive the sensing piston in the opposite direction, and wherein said sensing servo valve includes a housing having end chambers, piston means interposed therebetween, each end chamber connecting one actuator chamber by one fluid line for presenting a differential pressure upon said sensing piston depending on the load demands of said actuator and thereby operating said sleeve, for axially moving the sleeve inlet port relative to said pump piston thereby producing a change in the pressure and volume flow of the system proportional to the load demands of said actuator.

References Cited
UNITED STATES PATENTS

| | | | |
|---|---|---|---|
| 2,238,061 | 4/1941 | Kendrick | 60—52 X |
| 2,597,050 | 5/1952 | Audemar | 60—54.5 |
| 2,932,948 | 4/1960 | Neff et al. | 60—52 |
| 3,054,263 | 9/1962 | Budzich et al. | 60—52 X |
| 3,168,295 | 2/1965 | Dorrell et al. | 60—52 X |
| 3,234,726 | 2/1966 | Hann | 60—52 X |

EDGAR W. GEOGHEGAN, *Primary Examiner.*